(12) United States Patent
Wilson et al.

(10) Patent No.: US 11,746,243 B2
(45) Date of Patent: Sep. 5, 2023

(54) SILICONE-BASED PROTECTIVE FORMULATIONS

(71) Applicant: Autonomic Materials, Inc., Champaign, IL (US)

(72) Inventors: Gerald O. Wilson, Champaign, IL (US); Aidnel Geister R. Navarro, Champaign, IL (US); Subramanyam V. Kasisomayajula, Champaign, IL (US)

(73) Assignee: Autonomic Materials, Inc., Champaign, IL (US)

( * ) Notice: Subject to any disclaimer, the term of this patent is extended or adjusted under 35 U.S.C. 154(b) by 452 days.

(21) Appl. No.: 16/887,415

(22) Filed: May 29, 2020

(65) Prior Publication Data

US 2020/0377737 A1     Dec. 3, 2020

Related U.S. Application Data

(60) Provisional application No. 62/854,005, filed on May 29, 2019.

(51) Int. Cl.
| | |
|---|---|
| *C09D 7/40* | (2018.01) |
| *C09D 7/65* | (2018.01) |
| *C09D 183/04* | (2006.01) |
| *C09D 5/00* | (2006.01) |
| *C09D 5/08* | (2006.01) |
| *C08G 77/08* | (2006.01) |
| *B01J 23/42* | (2006.01) |
| *C08L 83/04* | (2006.01) |
| *B29C 73/22* | (2006.01) |
| *C08G 59/18* | (2006.01) |

(52) U.S. Cl.
CPC .............. *C09D 5/08* (2013.01); *B01J 23/42* (2013.01); *B29C 73/22* (2013.01); *C08G 59/188* (2013.01); *C08G 77/08* (2013.01); *C08L 83/04* (2013.01); *C08L 2207/53* (2013.01)

(58) Field of Classification Search
None
See application file for complete search history.

(56) References Cited

U.S. PATENT DOCUMENTS

| | | |
|---|---|---|
| 2009/0226228 A1 | 9/2009 | De Jong et al. |
| 2012/0101227 A1 | 4/2012 | Galeone et al. |
| 2016/0348248 A1 | 12/2016 | Fan et al. |
| 2019/0022990 A1 | 1/2019 | Wu et al. |

FOREIGN PATENT DOCUMENTS

| | | | |
|---|---|---|---|
| CN | 105440692 | 6/2018 | |
| KR | 1398113 B1 * | 5/2014 | ......... C08G 18/3203 |
| WO | 2014-018814 | 1/2014 | |

OTHER PUBLICATIONS

Machine translation of KR-1398113-B1 (no date).*
Chung, et al., "Polyurethane matrix incorporating PDMS-based self-healing microcapsules with enhanced mechanical and thermal stability" Colloids and Surfaces A: Physiochemical and Engineerings Aspects, Elsevier, Amsterdam, NL, vol. 518, Jan. 15, 2017; pp. 173-180.
"Silicones", Apr. 15, 2003, Encyclopedia of Polymer Science and Technology, Wiley, US, vol. 11, pp. 765-841.
Extended European Search Report issued in European Application No. 20815540.8, dated May 26, 2023; 8 pages.

* cited by examiner

*Primary Examiner* — Michael J Feely

(74) *Attorney, Agent, or Firm* — Schwabe, Williamson & Wyatt, PC

(57) ABSTRACT

Self-healing compositions, method of preparation and uses thereof are disclosed. In an example, a self-healing composition includes a first microcapsule and a second microcapsule. The first microcapsule includes a first polydimethylsiloxane resin, a first silicone fluid, a first functionalized alkoxysilane, and a catalyst capable of catalyzing hydrosilylation reactions, and the second microcapsule includes a second polydimethylsiloxane resin, a second silicone fluid, a second functionalized alkoxysilane, and a hydrogen-terminated dimethyl siloxane resin. In this way, the self-healing composition releases and mixes contents of the first microcapsule and the second microcapsule upon the rupture thereof, imparting a passively initiated repair process to the self-healing composition.

45 Claims, 15 Drawing Sheets

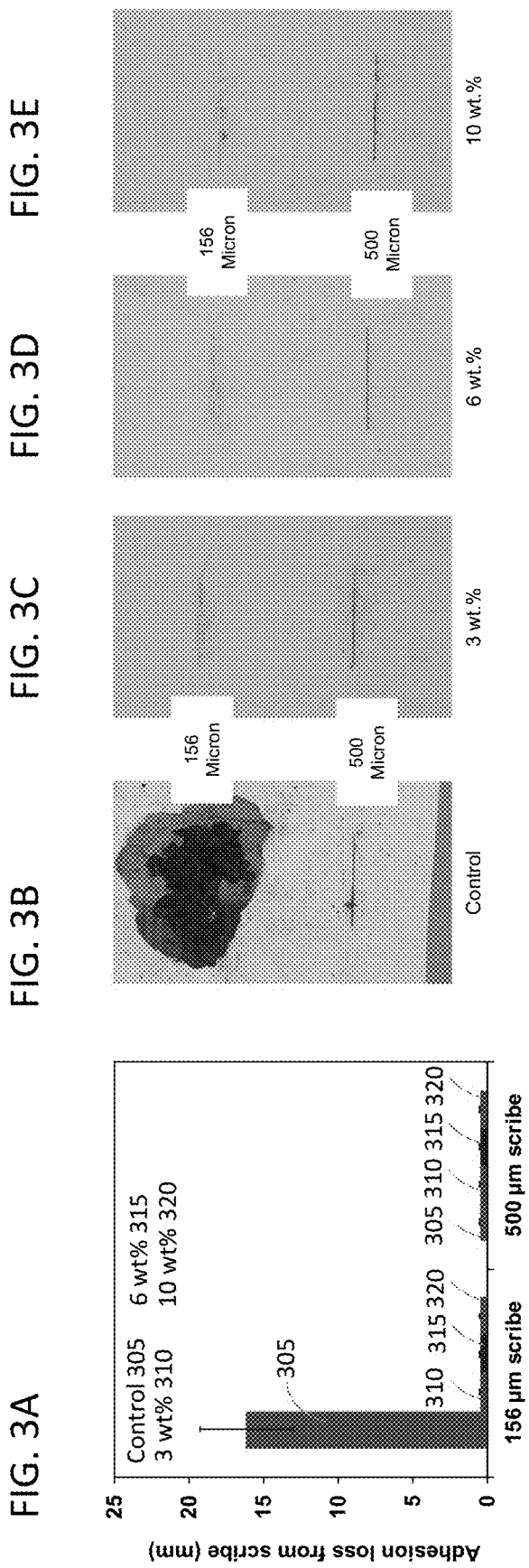

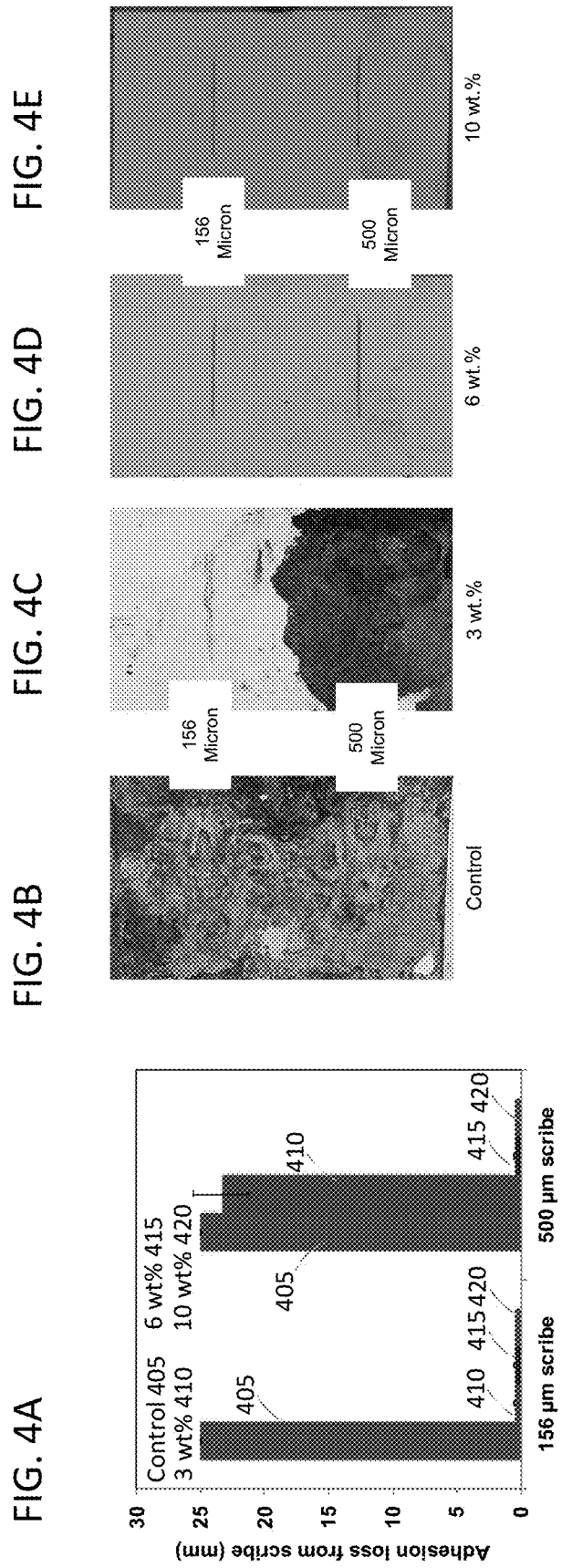

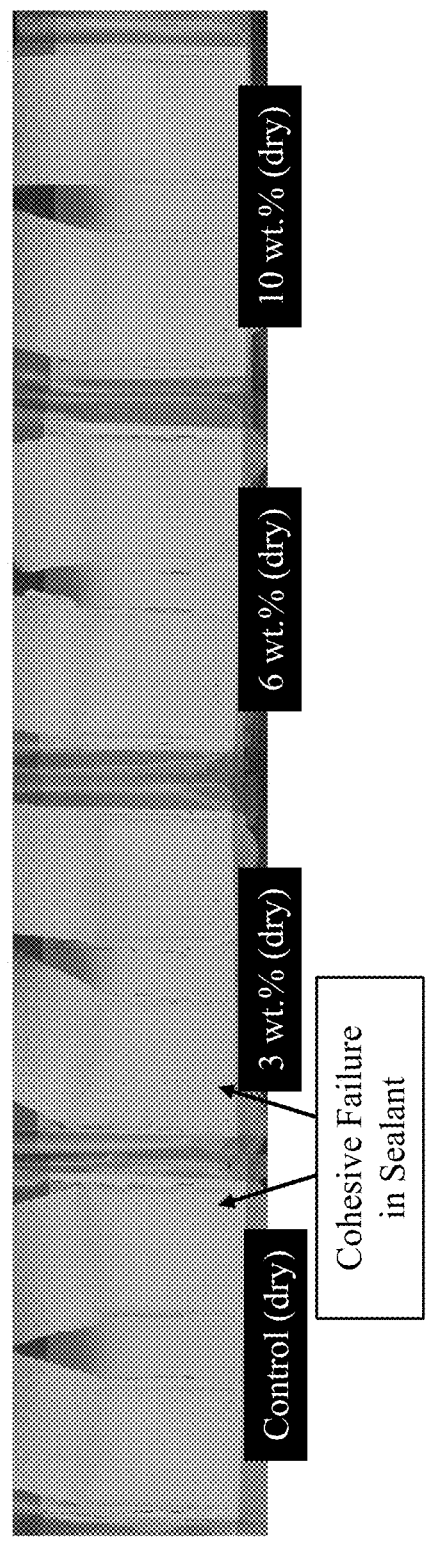

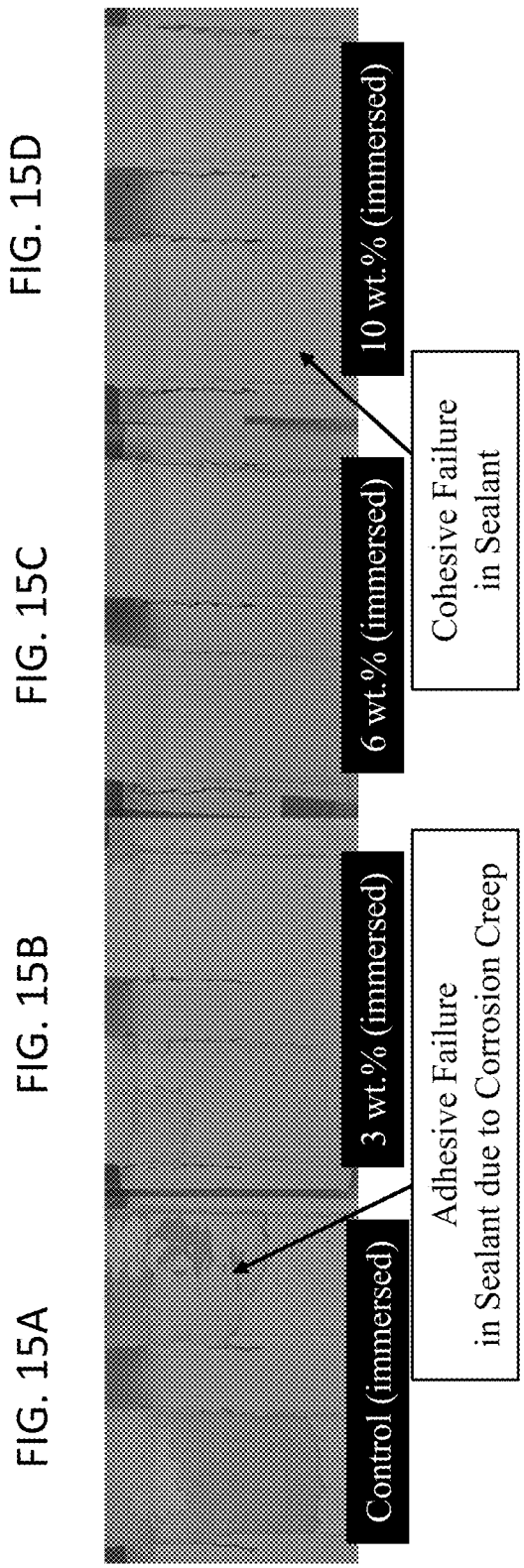

SILICONE-BASED PROTECTIVE FORMULATIONS

This application claims the priority benefit of the earlier filing date of U.S. Provisional Patent Application No. 62/854,005, filed May 29, 2019, which is specifically incorporated herein by reference in its entirety.

TECHNICAL FIELD

The present disclosure relates to protective materials, coatings, sealants and adhesives, and in particular, silicone based formulations for protective materials, coatings, sealants and adhesives.

BACKGROUND

Silicone-based formulations are typically used in applications where their hydrophobicity and flexibility can be used for the protection of various assets. As such, they are commonly used in the formulation of coatings, sealants and adhesives that are used in moisture-rich environments and in environments that are likely to experience thermal cycling that would cause more brittle materials to crack and fail. Silicone protective materials are also known to exhibit poor adhesion to a broad range of substrates. In cases where these formulations are designed to incorporate the most efficient of adhesion promoters, damage in service often creates a passage for moisture ingress. Moisture penetration into the material/substrate interface after damage occurs may rapidly compromise the adhesion of the material to the substrate. There is no current commercial solution to the problem of damage creating a point of entry for moisture ingress in silicone-based materials and the resulting adhesion loss and compromised substrate protection. The status quo generally focuses on improved resin chemistries with mechanical properties that decrease the likelihood of damage and eventual adhesion loss. However, should damage in fact occur, the underlying substrate would be exposed or more accessible and as such, susceptible to moisture ingress, adhesion loss and compromised protection.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIG. 1A depicts a standard formulation, and FIG. 1B depicts a formulation incorporating two different types of microcapsules (AMPARMOR™ 1043A and 1043B).

FIGS. 3A-3E are a graph and corresponding digital images that together show adhesion loss due to scribe and representative images of coated substrates after 300 h of salt fog exposure (ASTM B117-19, Standard Practice for Operating Salt Spray (Fog) Apparatus, ASTM International, West Conshohocken, Pa., 2019), ASTM International, West Conshohocken, Pa.). FIG. 3A is a graph illustrating a quantification of adhesion loss measured from scribe damage applied to cold rolled steel (CRS) substrates coated with a standard moisture-oxime cured polydimethylsiloxane (PDMS) coating (control) compared with versions additionally incorporating 3 wt %, 6 wt % and 10 wt % AMPARMOR 1043. FIG. 3B is an image of the CRS substrate coated with the control PDMS coating. FIG. 3C is an image of the CRS substrate coated with PDMS coating incorporating 3 wt % AMPARMOR 1043. FIG. 3D is an image of the CRS substrate coated with PDMS coating incorporating 6 wt % AMPARMOR 1043. FIG. 3E) is an image of the CRS substrate coated with PDMS coating incorporating 10 wt % AMPARMOR 1043.

FIGS. 4A-4E are a graph and corresponding digital images that show adhesion loss from scribe of coated substrates after 1000 h of salt fog exposure (ASTM B117). FIG. 4A is a graph illustrating a summary of adhesion loss measured from scribe damage applied to CRS substrates coated with a standard moisture-oxime cured PDMS coating (control) compared with versions additionally incorporating 3 wt %, 6 wt % and 10 wt % AMPARMOR 1043. FIG. 4B is an image of the CRS substrate coated with the control PDMS coating. FIG. 4C is an image of the CRS substrate coated with PDMS coating incorporating 3 wt % AMPARMOR 1043. FIG. 4D is an image of the CRS substrate coated with PDMS coating incorporating 6 wt % AMPARMOR 1043. FIG. 4E is an image of the CRS substrate coated with PDMS coating incorporating 10 wt % AMPARMOR 1043.

FIG. 5A depicts Bode impedance plots and FIG. 5B depicts Bode phase angle plots.

FIG. 6A depicts substrate coated with moisture-oxime cured PDMS coating. FIG. 6B depicts substrate coated with the same moisture-oxime cured PDMS coating incorporating 10 wt % of AMPARMOR 1043.

AMPARMOR 1043. The peel tests were performed on samples exposed to ASTM B117 conditions for 1000 h.

Figure 13:
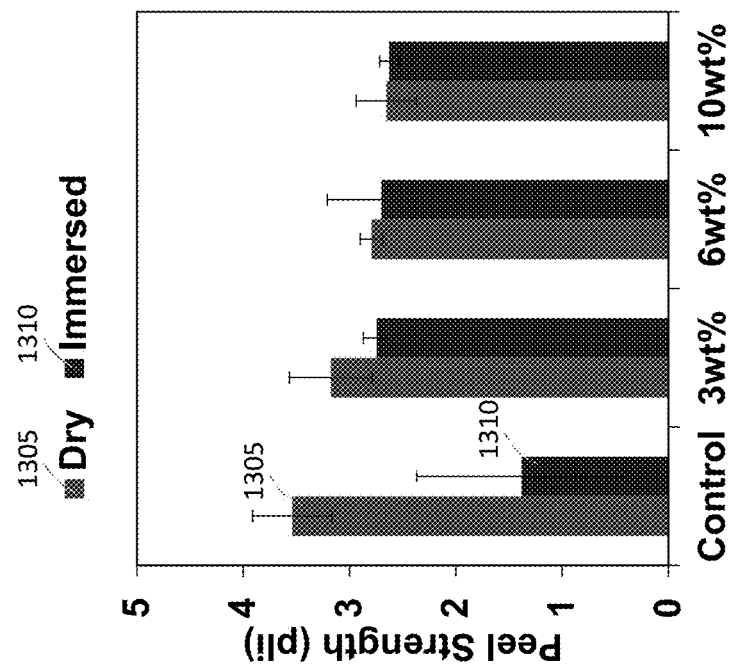

FIG. 13 is a graph showing a summary of peel test results obtained for a control sealant formulation as well as formulations incorporating 3 wt %, 6 wt %, and 10 wt % AMPARMOR 1043. Peel strengths evaluated for dry samples (samples which were not immersed) are compared to those immersed in deionized water for 7 days.

FIGS. 14A-14D depict a set of digital images acquired following peel tests of a control sealant formulation as well as formulations incorporating 3 wt %, 6 wt %, and 10 wt % AMPARMOR 1043. The peel tests were performed after allowing the samples to cure at room temperature for 14 days.

FIGS. 15A-15D depict a set of digital images acquired following peel tests of a control sealant formulation as well as formulations incorporating 3 wt %, 6 wt %, and 10 wt % AMPARMOR 1043. The peel tests were performed following curing of the samples at room temperature for 14 days and immersion in deionized water for 7 days.

DETAILED DESCRIPTION OF EMBODIMENTS OF THE INVENTION

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Disclosed herein are compositions, methods of preparation, and methods of use thereof to improve the ability of a protective material (e.g., coating or sealant) to maintain its adhesion to the underlying substrate after some amount of degradation (e.g., scratch, cut, etc.) of the protective material has occurred. The protective material may comprise a silicone-based protective material in some examples. In some examples, the silicone-based protective material may comprise a room temperature vulcanizing (RTV) silicone-based protective material (e.g., 1K, 2K, etc.). In other examples, the protective material may comprise an epoxy protective material. In another example, the protective material may comprise a polyester protective material. In another example, the protective material may comprise a polyurethane protective material. In still other examples, the protective material may comprise an acrylic protective material.

The disclosed aspects are based on the use of dual microcapsules comprising two separate microcapsules having an at least somewhat differing internal composition or formulation as compared to one another. The dual microcapsules are incorporated into a protective material, including but not limited to a coating, a sealant, an adhesive, or some combination of thereof, prior to application on a substrate. In one example, the substrate may be metal. In another example, the substrate may be a metal alloy (e.g., a metal mixed with another metal or non-metal). In another example, the substrate may comprise a plastic. In yet another example, the substrate may comprise a ceramic. It may be understood that the substrate may comprise any material that can be afforded some coating, sealant, and/or adhesive comprised of the protective material.

When the protective material is compromised, both types of microcapsules may rupture, thereby releasing their individual contents at the site of degradation. Upon rupture, the components within the two different types or varieties of microcapsules are mixed together, and the mixing initiates a polymerization reaction that in turn forms a new material that at least partially repairs or counteracts the degradation. The contents within each of the microcapsules (e.g., polymer precursor formulations) may react with each other to form a polymeric silicone material, for example. By using polymer precursor formulations that are completely comprised of silicone-based materials, wet out and adhesion to the silicone protective material after the protective material has been compromised, is facilitated. Discussed herein, wet out refers to the polymer precursor formulation flowing and covering a surface to maximize a contact area and attractive force(s) between the polymer precursor formulations and bonding surface (e.g., silicone protective material and/or substrate).

More specifically, the polymer precursor formulations herein discussed include one or more alkoxysilane(s) to promote adhesion of the polymerized film to a metal substrate. Both capsule types (e.g., a first capsule with a first set of internal components and a second capsule with a second set of internal components) can be incorporated into a silicone-based protective material (or other type of protective material as mentioned above) such as a coating, sealant or adhesive prior to application on a substrate. Degradation of the silicone-based protective material, for example by scratching or cutting, ruptures the microcapsules, thereby releasing their individual contents at the site of the degradation. At the site of degradation the contents of both capsule types mix, initiating a hydrosilylation reaction. The hydrosilylation reaction forms a cured film that may restore the protective material's adhesion to the substrate and additionally may contribute to mitigation of moisture ingress at the site of degradation.

Figure 1B:
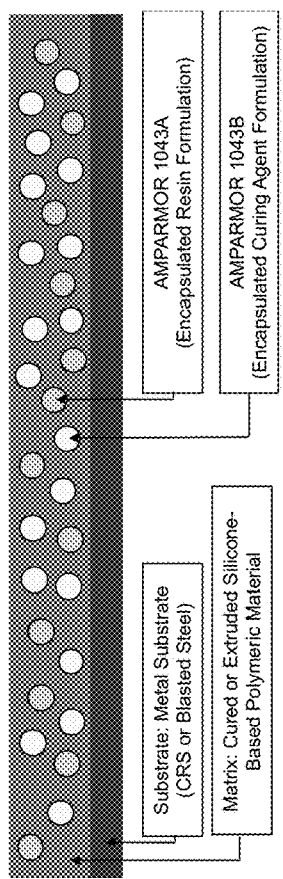
FIGS. 1A and 1B are schematics that show silicone-based coating or sealant formulations.
Figure 1A:
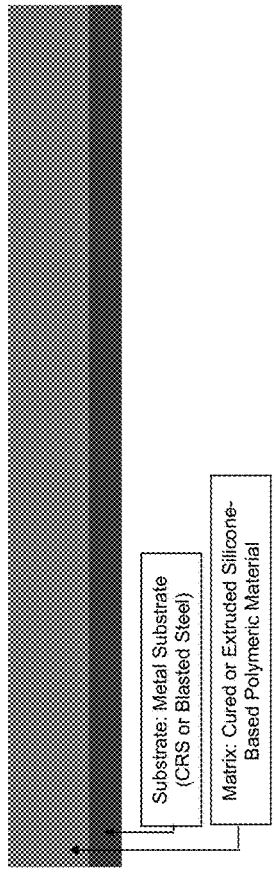

A schematic depicting this two-part system is shown in FIGS. 1A-1B. FIG. 1A shows an example where no microcapsules have been incorporated into the matrix that is applied to the substrate. As illustrated at FIG. 1A, such a matrix may comprise cured or extruded silicone-based polymeric material, and the substrate may comprise a metal substrate (e.g., CRS or blasted steel), for example. Alternatively, FIG. 1B shows an example where a first microcapsule (e.g., AMPARMOR™ 1043A) comprising an encapsulated resin formulation, and a second microcapsule (e.g., AMPARMOR™ 1043B) comprising an encapsulated curing agent formulation, have been incorporated into the matrix and applied to the substrate. Similar to FIG. 1A, the matrix at FIG. 1B may comprise cured or extruded silicone-based polymeric material, and the substrate may comprise metal substrate (e.g., CRS or blasted steel), for example. In some examples, the silicone protective material containing the disclosed microencapsulated silicone-based polymer precursor formulations is used for the protection of, or joining of a broad range of substrates including but not limited to combinations of different substrates. For example, the silicone protective material containing the disclosed microencapsulated silicone-based polymer precursor formulations may be used to join metal substrates, to join rubber substrates, to join metal substrates to rubber substrates, and so on.

Aspects of the present disclosure concern a self-healing composition that includes a first microcapsule and a second microcapsule. In embodiments, the first microcapsule includes an encapsulated silicone-based resin formulation. The encapsulated silicone-based resin formulation may be understood to be contained or encapsulated within the first microcapsule. The encapsulated silicone-based resin formulation may include a first multicomponent composition that comprises: a first polydimethylsiloxane resin; a first silicone fluid; a first functionalized alkoxysilane and a catalyst capable of catalyzing hydrosilylation reactions. In embodiments, the second microcapsule includes an encapsulated silicone-based curing formulation. The encapsulated silicone-based curing formulation may be understood to be contained or encapsulated within the second microcapsule. The encapsulated silicone-based curing formulation may include a second multicomponent composition that comprises: a second polydimethylsiloxane resin; a second silicone fluid; a second functionalized alkoxysilane; and a hydrogen-terminated dimethyl siloxane resin. In embodiments, the first polydimethylsiloxane resin and the second polydimethylsiloxane resin are the same, for example, having the same chemical formula. In other embodiments, the first polydimethylsiloxane resin and the second polydimethylsiloxane resin are different, for example, having different chemical formula. In embodiments, the first silicone fluid and the second silicone fluid are the same, for example, having the same chemical formulas and/or a mixture of chemical components or constituents of the same relative percentages. In embodiments, the first silicone fluid and the second silicone fluid are different, for example, having different chemical formulas and/or a mixture of chemical components of different relative percentages.

In certain embodiments, the functional group on the first and second functionalized alkoxysilanes is selected such as to be reactive with common coating, adhesive, and/or sealant binder resin systems, such as silicon based coating, adhesive, and/or sealant binder resin systems. Examples of functional groups for use in the disclosed functionalized alkoxysilanes include, but are not limited to one or more of, a glycidyl, a vinyl, an acrylate, an isocyanate, a hydroxyl, an amine, a thiol, a carboxyl, an amide, a fatty acid or an alkyd group. In an embodiment the first polydimethylsiloxane resin comprises a vinyl-terminated siloxane resin, such as, but not limited to, a vinyl-terminated dimethylsiloxane resin. In another embodiment, the first polydimethylsiloxane resin comprises an acrylate-terminated siloxane resin. In an embodiment, the first silicone fluid is a first siloxane fluid, such as a cyclic siloxane or cyclomethicone. In one example, the first silicone fluid is one or more of hexamethyldisiloxane, octamethyltrisiloxane, dodecamethylpentasiloxane, tetradecamethylhexasiloxane, and decamethyltetrasiloxane. In an embodiment, the first functionalized alkoxysilane comprises one or more of 3-glycidoxypropyltrimethoxysilane, 3-glycidoxypropyltriethoxysilane, 3-aminopropyltrimethoxysilane, 3-aminopropyltriethoxysilane, methacrylpropyltrimethoxysilane, and methacrylpropyltriethoxysilane. In an embodiment, the catalyst capable of catalyzing hydrosilylation reactions comprises a platinum catalyst. One such example includes Speier's catalyst ($H_2PtCl_6$). Another example includes Karstedt's catalyst ($C_{24}H_{54}O_3Pt_2Si_6$). Other, similar derivatives that can be used for the catalysis of hydrosilylation reactions are herein contemplated. In an embodiment, the second polydimethylsiloxane resin is a vinyl-terminated dimethylsiloxane resin. In an embodiment the second functionalized alkoxysilane comprises one or more of 3-glycidoxypropyltrimethoxysilane or 3-glycidoxypropyltriethoxysilane.

In an embodiment the composition further includes a silicone-based protective material, such as a coating, sealant and/or adhesive.

In embodiments herein, each of the first microcapsule and the second microcapsule have a shell wall that encapsulates the first multicomponent composition and the second multicomponent composition, respectively. In examples, the shell wall may comprise a polymeric shell wall. The shell wall of the first microcapsule may be comprised of the same materials/chemical constituents as the second microcapsule in some embodiments. However, in other embodiments, the shell wall of the first microcapsule may be comprised of different materials/chemical constituents as the second microcapsule. In some examples where the materials/chemical constituents are the same between the first microcapsule and the second microcapsule, ratios of the materials/chemical constituents may differ, however in other examples the ratios may be the same. In an embodiment the polymeric shell wall comprises polyoxymethylene urea (urea-formaldehyde). In another embodiment, the polymeric shell wall comprises polyoxymethylene melamine (melamine-formaldehyde). In another embodiment, the polymeric shell wall comprises one or more of polyacrylates, polyurethane, polystyrene and polyurea. The above-mentioned components of the polymeric shell wall may be used in any combination and any amounts for each of the first microcapsule and the second microcapsule.

Also disclosed is a method of preparing a self-healing composition. The method includes encapsulating a silicone-based resin formulation in a first microcapsule and encapsulating a silicone-based curing formulation in a second microcapsule. The method further includes adding a first amount of the first microcapsule and a second amount of the second microcapsule to a fluid matrix to obtain the self-healing composition. In an example, the fluid matrix further comprises one of a silicone-based matrix, an epoxy matrix, a polyester matrix, a polyurethane matrix, or an acrylic matrix. The method may further include drying the first microcapsule and the second microcapsule into a powder form prior to adding the first microcapsule and the second microcapsule to the fluid matrix. However, it may be understood that in other examples the method may not include the drying process, where a wet form of the first microcapsule and the second microcapsule are added to the fluid matrix.

In some examples of the method, the first amount of the first microcapsule and the second amount of the second microcapsule may comprise the same amount; however, in other examples, the first amount and the second amount may comprise different amounts.

In an example of the method, each of the first microcapsule and the second microcapsule further comprise a shell wall. The shell wall may comprise a polymeric shell wall, as an example. In some embodiments, the shell wall comprises one or more of polyoxymethylene urea, polyoxymethylene melamine, polyacrylates, polyurethane, and polyurea. The shell wall may be the same between the first microcapsule and the second microcapsule in some embodiments, but may be different in other embodiments, without departing from the scope of this disclosure.

In an example of the method, the silicone-based resin formulation further comprises a first polydimethylsiloxane resin, a first silicone fluid, a first functionalized alkoxysilane, and a catalyst capable of catalyzing hydrosilylation reactions. The silicone-based curing formulation further comprises a second polydimethylsiloxane resin, a second silicone fluid, a second functionalized alkoxysilane, and a hydrogen-terminated dimethyl siloxane resin. In some examples, the first polydimethylsiloxane resin and the second polydimethylsiloxane resin further comprise a vinyl-terminated dimethylsiloxane resin. In some examples, the first functionalized alkoxysilane and the second functionalized alkoxysilane further comprise one or more of 3-glycidoxypropyltrimethoxysilane or 3-glycidoxypropyltriethoxysilane. In some examples, the catalyst further comprises a platinum catalyst. The platinum catalyst may be $H_2PtCl_6$, or may be $C_{24}H_{54}O_3Pt_2Si_6$.

In some examples, the first microcapsule and the second microcapsule may have a median particle diameter in a range of 1 micron to 50 microns. In some examples, the range may be between 5 and 30 microns. In still other examples, the range may be between 10 and 25 microns. In still other examples, the range may be between 5 and 50 microns. Other greater or lesser median particle diameter ranges are contemplated herein.

In another aspect, a method for protecting a substrate is herein disclosed. The method comprises applying a formulation to the substrate that hardens or cures to a protective material, the formulation including a first microcapsule having an encapsulated silicone-based resin formulation and a second microcapsule having an encapsulated silicone-based curing formulation.

In an example of the method, the encapsulated silicone-based resin formulation further comprises a first polydimethylsiloxane resin, a first silicone fluid, a first functionalized alkoxysilane, and a catalyst capable of catalyzing hydrosilylation reactions. As an example, the first polydimethylsiloxane resin comprises a vinyl-terminated polydimethylsiloxane resin. As another example, the catalyst further comprises a platinum catalyst.

In an example of the method, the encapsulated silicone-based curing formulation further comprises a second polydimethylsiloxane resin, a second silicone fluid, a second functionalized alkoxysilane, and a hydrogen-terminated polydimethylsiloxane resin. In one such example, the second polydimethylsiloxane resin comprises a vinyl-terminated polydimethylsiloxane resin.

In an example of the method, the first microcapsule further comprises a first polymeric microcapsule shell wall, and the second microcapsule further comprises a second polymeric microcapsule shell wall. In some examples, the first polymeric microcapsule shell wall is comprised of a same chemical constituent as that of the second polymeric microcapsule shell wall. In another example, the first polymeric microcapsule shell wall is comprised of a different chemical constituent as that of the second polymeric microcapsule shell wall. The first microcapsule and the second microcapsule may have a median particle diameter in a range of 1 to 40 microns, preferably in a range of 5 to 30 microns, even more preferably in a range of 10 to 25 microns. In some examples, the first microcapsule and the second microcapsule may have a median particle diameter in a range of 5 to 50 microns.

In such a method, degradation of the protective material results in rupture of the first microcapsule and the second microcapsule at the site of the degradation, further resulting in a mixing of the encapsulated silicone-based resin formulation with the encapsulated silicone-based curing formulation. Discussed herein, degradation may refer to one or more of a mechanical failure, a scratch, a crack, a cut or other form of a breach of integrity of the protective material. Protecting the substrate may comprise reducing corrosion of the substrate by preventing or reducing moisture ingress in response to the degradation. Protecting the substrate may additionally or alternatively comprise improving an adhesion of the formulation to the substrate and/or increasing a peeling resistance of the formulation with regard to its adhesion to the substrate.

In some examples of the method, the formulation may further include a fluid matrix. The fluid matrix may comprise a matrix to which the first microcapsule and the second microcapsule are added. The fluid matrix may comprise a silicone-based fluid matrix, in some examples. In other examples, the fluid matrix may comprise one of an epoxy fluid matrix, a polyester fluid matrix, a polyurethane fluid matrix, an acrylic fluid matrix, or a polystyrene fluid matrix.

In yet another aspect, disclosed herein is a method for increasing a peel-resistance of a coating, sealant, or adhesive for a substrate. The method includes applying a formulation to the substrate that hardens to the coating, sealant, or adhesive upon application to the substrate, the formulation and the coating, sealant or adhesive comprising a first microcapsule with an encapsulated silicone-based resin formulation and a second microcapsule having an encapsulated silicone-based curing formulation. In such a method, a degradation of the coating, sealant, or adhesive causes the first microcapsule and the second microcapsule to rupture, thereby mixing the encapsulated resin formulation and the encapsulated curing formulation at the site of the degradation and increasing the peel-resistance of the coating, sealant or adhesive. The degradation may include one or more of a mechanical failure, a scratch, a crack, a cut, a dent, or other breach of the integrity of the coating, sealant, or adhesive.

In an example of the method, the encapsulated silicone-based resin formulation further comprises a first polydimethylsiloxane resin, a first silicone fluid, a first functionalized alkoxysilane, and a catalyst capable of catalyzing hydrosilylation reactions. The encapsulated silicone-based curing formulation further comprises a second polydimethylsiloxane resin, a second silicone fluid, a second functionalized alkoxysilane, and a hydrogen-terminated polydimethylsiloxane resin.

In some examples of the method, each of the first polydimethylsiloxane resin and the second polydimethylsiloxane resin each comprise a vinyl-terminated polydimethylsiloxane resin. The catalyst may comprise a platinum catalyst. The first silicone fluid and the second silicone fluid may be the same in some examples, but may be different in other examples. The first functionalized alkoxysilane and the second functionalized alkoxysilane may be the same in some examples, but may be different in other examples. In one particular example, the first functionalized alkoxysilane and the second alkoxysilane are selected from the group consisting of 3-glycidoxypropyltrimethoxysilane and 3-glycidoxypropyltriethoxysilane.

In some examples of the method, the first microcapsule and the second microcapsule are further comprised of a polymeric shell wall. The polymeric shell wall may be one or more of polyoxymethylene urea, polyoxymethylene melamine, polyacrylate, polyurethane, polystyrene, and polyurea. In some examples the polymeric shell wall for the first microcapsule may be comprised of the same chemical constituents as that of the second microcapsule, but in other examples the chemical constituents may be different without departing from the scope of this disclosure.

In some examples of the method, the coating, sealant, or adhesive for the substrate may be silicone-based, or may be an epoxy, a polyester, a polyurethane, or an acrylic.

Performance Improvement in Silicone Coatings

Figure 2:
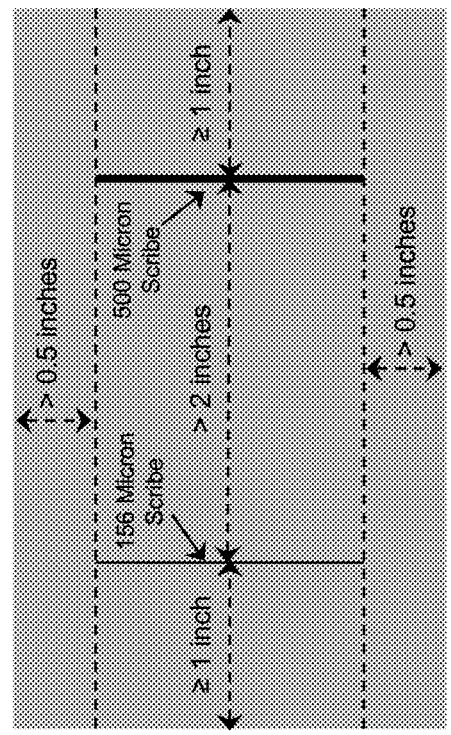
FIG. 2 is a schematic that shows the configuration of scribe damage on a metal substrate.

The use of silanes and siloxanes as components of the microcapsules as disclosed herein may improve the homogeneity of the core material blends and may increase the robustness of the resulting capsules due to an increased thermal stability and a decreased solubility in typical coating solvents. Such improvements to the robustness of resulting capsules may contribute advantageously to maintaining the microcapsule core material blends within the capsule and maintaining capsule shell wall integrity. This self-healing technology comprising the use of microcapsules as disclosed herein was evaluated in a commercially available moisture-oxime cured silicone coating. Specifically, Capsule Type A (AMPARMOR™ 1043A) and Capsule Type B (AMPARMOR™ 1043B) were prepared as outlined in Examples 1 and 2 below, respectively. A self-healing version of the moisture-cured silicone coating was prepared by adding a specified amount of Type A and Type B capsules to the coating in a 1:1 wt/wt ratio as described in Example 5. The resulting formulations were then applied to cold-rolled steel substrates (CRS), prepared as described in Example 3, using a drawdown bar at a dry film thickness (DFT) of 450-500 microns. The coated substrates were then scribed using 156-micron and 500-micron scribe tools. An illustrative example of the different scribe dimensions and their relation to one another on the coated substrates is as depicted in FIG. 2. A full description of the coating application, scribing and testing protocol is provided in Examples 5 and 7. After allowing the scribed panels to equilibrate at room temperature for 24 h, they were then exposed to a salt fog (ASTM B117). Disparate sets of the exposed panels were then evaluated at 300 h and 1000 h.

The results for the exposure to 300 h are summarized in FIGS. 3A-3E. For the samples exposed to a salt fog for 300 h, loss of adhesion around a scribe and corrosion creep was only observed for the standard commercially available moisture-cured silicone coating. Specifically, upon assessing the adhesion of the coating around the scribe by scraping as described in ASTM 1654, method 2 (ASTM D1654-08 (2016)e1, Standard Test Method for Evaluation of Painted or Coated Specimens Subjected to Corrosive Environments, ASTM International, West Conshohocken, Pa., 2016), loss of adhesion was observed only around the scribe for the standard commercially available moisture-cured silicone coating (the control). Over 15 mm of adhesion loss was observed for this coating (FIG. 3A) and the removal of the coating exposed a significant amount of corrosion on the underlying substrate (FIG. 3B). In comparison, no loss of adhesion was observed for versions of the same coating incorporating a Type A and Type B capsules in a ratio of 1:1 Type A:Type B at total concentrations of 3 wt %, 6 wt %, and 10 wt % (FIG. 3A and FIGS. 3C-3E). At FIG. 3A, control is represented by numeral 305, the 3 wt % version is represented by numeral 310, the 6 wt % version is represented by numeral 315, and the 10 wt % version is represented by numeral 320. A different set of panels that were otherwise identically prepared and scribed were exposed to a salt fog for 1000 h. The results obtained upon evaluation of these panels are provided in FIGS. 4A-4E. After 1000 h of salt fog exposure, the control exhibited significant loss of adhesion around both scribes with the extent of adhesion loss measured around the scribes increasing from 15 mm around the 156-micron scribe after 300 h of salt fog exposure (refer to FIG. 3A) to roughly 25 mm of adhesion loss around both scribes after 1000 h (FIG. 4A). Furthermore, the control exhibited significant corrosion on just about the entire surface (FIG. 4B). The versions incorporating the Type A and Type B capsules all exhibited better performance relative to the control. While no loss of adhesion or corrosion creep was observed on any of the versions incorporating the capsules after 300 h of salt fog exposure (refer to FIGS. 3A-3E), after 1000 h of exposure, adhesion loss and corrosion creep was observed upon evaluation of the coating formulation incorporating 3 wt % of Type A and Type B capsules (FIG. 4A, 500 micron scribe). However, no adhesion loss or corrosion creep was observed for substrates coated with formulations incorporating 6 wt % and 10 wt % of the self-healing additive (FIG. 4A and FIGS. 4D-4E). At FIG. 4A, control is represented by numeral 405, the 3 wt % version is represented by numeral 410, the 6 wt % version is represented by numeral 415, and the 10 wt % version is represented by numeral 420. These results imply a level of tunability to the improved adhesion and corrosion resistance afforded by the incorporation of the Type A and Type B microcapsules. In other words, for more corrosive environments or protective formulations required in service for a longer period of time, higher concentrations (e.g. 6 wt % and 10 wt %) of the Type A and Type B capsules may be needed, while for milder conditions or shorter durations, lower concentrations (3 wt %) may suffice.

Figure 5B:
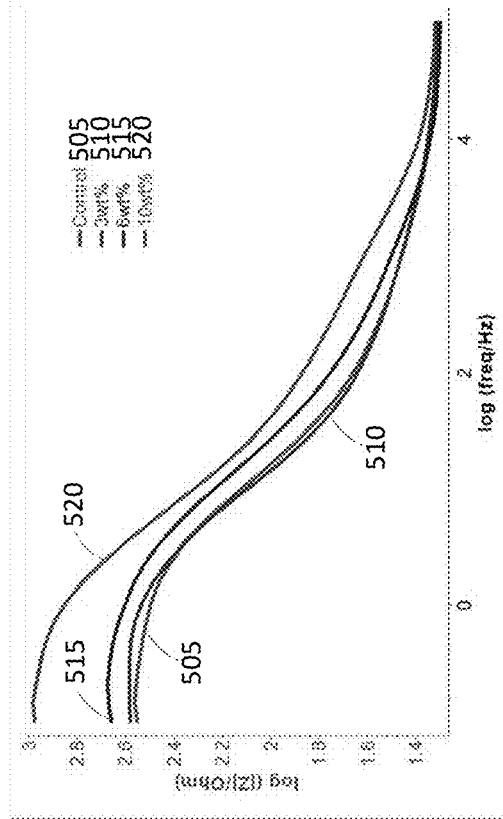
FIGS. 5A and 5B are graphs that show an electrochemical characterization of a control moisture-oxime cured PDMS coating compared with versions incorporating 3 wt %, 6 wt % and 10 wt % AMPARMOR 1043.
Figure 5A:
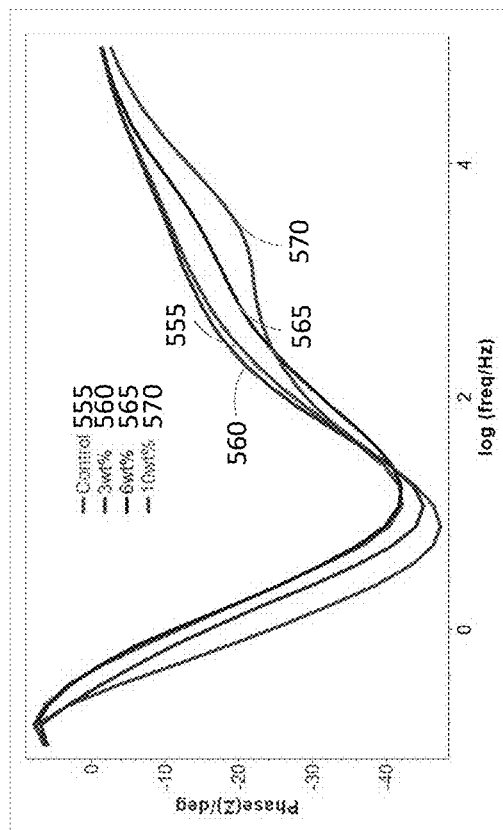

CRS panels coated with the standard moisture-oxime cured silicone coating and versions incorporating 3 wt %, 6 wt %, and 10 wt % of the combination of Type A and Type B capsules were further evaluated via electrochemical impedance spectroscopy (EIS) (refer to Example 8 for additional details). The evaluations were performed on substrates coated at dry film thicknesses of between 200 and 250 microns. The panels were scribed using a 500-micron scribe tool and allowed to equilibrate at room temperature for 48 h prior to evaluation via EIS. Resulting Bode Impedance and Bode phase angle plots are shown in FIG. 5A and FIG. 5B, respectively. As shown in FIG. 5A, the formulation incorporating 10 wt % of the combination of Type A and Type B capsules (AMPARMOR 1043) exhibited higher impedance relative to the control at all frequencies below $10^4$ Hz. The formulation incorporating 6 wt % AMPARMOR 1043 exhibited higher impedance relative to the control at frequencies less than $10^3$ Hz. Finally, the impedance of the formulation incorporating 3 wt % AMPARMOR 1043 tracked closely with the impedance of the control at all frequencies, exhibiting a slightly higher impedance relative to the control at frequencies less than 2.5 Hz. Impedance properties at higher frequencies are generally associated with pore resistance and coating capacitance of a coating close to the scribe. The impedance exhibited by the coating formulations incorporating 6 wt % and 10 wt % of AMPARMOR 1043 suggests that the incorporation of microcapsules and the release of healing agents from these capsules when a coating is damaged by scribing led to an improvement in the pore resistance of the coating close to the scribe and as well as the corresponding coating capacitance of the coating. Further, impedance properties at lower frequencies can be correlated with double layer capacitance and charge-transfer resistance at the interface of the coated steel substrate and the electrolyte solution present within the scribe. As such, the increase in impedance relative to the control at 0.1 Hz observed with the incorporation of AMPARMOR 1043 microcapsules can be attributed to the improvement in corrosion resistance of the coating at the scribe.

Phase angle data, shown in FIG. 5B, is indicative of the degree of resistive and capacitive behavior of a coating. As illustrated in FIG. 5B, all the coating formulations evaluated exhibited similar trends in phase angle measurements with more resistive behavior observed at higher and lower frequencies while more capacitive behavior was observed in the middle frequency region.

Figure 6B:
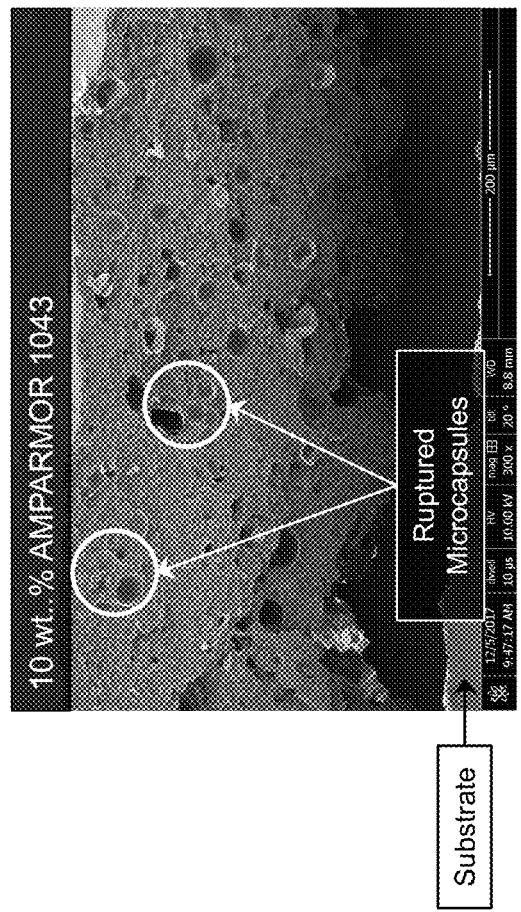
FIGS. 6A and 6B are digital images showing a comparison of cross-sections of coated CRS substrates.
Figure 6A:
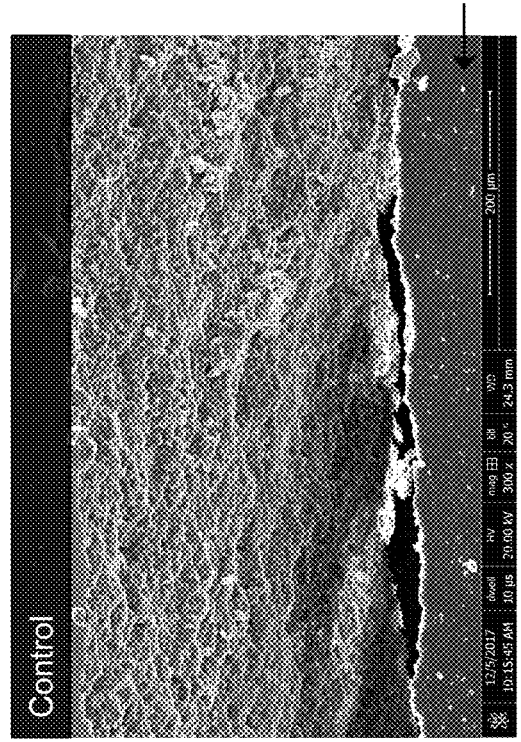

To further characterize the mechanism responsible for the improved adhesion maintenance and corrosion resistance observed for the coating formulations incorporating AMPARMOR 1043, cross-sections of a representative CRS panel coated with the control and one coated with a formulation incorporating 10 wt % of AMPARMOR 1043 were evaluated by scanning electron microscopy (SEM). Images comparing both samples are provided in FIGS. 6A-6B. While the cross-section of the control exhibited a relatively smooth morphology (FIG. 6A), ruptured microcapsules are visible in the cross-section of the coating containing the AMPARMOR 1043 capsules (FIG. 6B). The presence of ruptured microcapsules in the cross-section of the formulation incorporating AMPARMOR 1043 is further confirmation of a mechanism of improved corrosion resistance via healing agent release from the embedded capsules.

Performance Improvement in Silicone Sealants and Adhesives

Figure 7A:
FIGS. 7A-7C depict a set of digital images of the preparation of ASTM C794 samples showing a first silicone sealant layer (FIG. 7A), polyester mesh positioned on the first sealant layer (FIG. 7B), and a final silicone sealant layer applied on the polyester mesh (FIG. 7C).
Figure 7B:
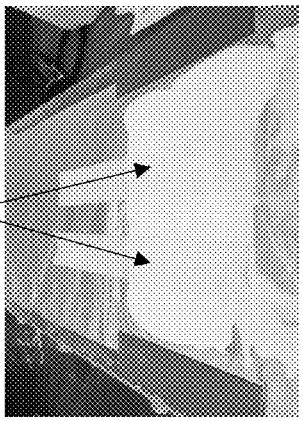
Figure 7C:
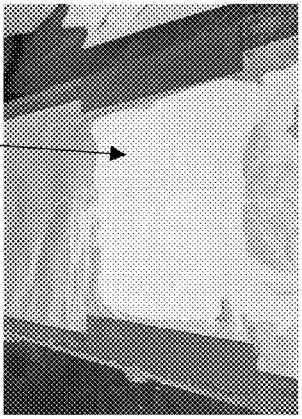

Similar evaluations were performed in sealant formulations based on the moisture-oxime cured PDMS. For these evaluations, following ASTM C794 procedures, the sealant formulation was applied to clean CRS Substrates as shown in FIG. 7 (refer to Example 6 for additional details). The first silicone sealant layer was applied to obtain approximately 500-550 microns of wet film (FIG. 7A). The ends of two 1-inch×10-inch strips of low-profile fusion-bonded reinforcing polyester fiber mesh were placed on top of the wet film, 0.5 inches apart, along the 3-inch side of the 3-inch×5-inch panels (FIG. 7B). The final silicone sealant layer was applied to obtain a total dry film thickness 1000 to 1100 microns (FIG. 7C). The samples were allowed to cure at room temperature for 14 days.

Figure 8:
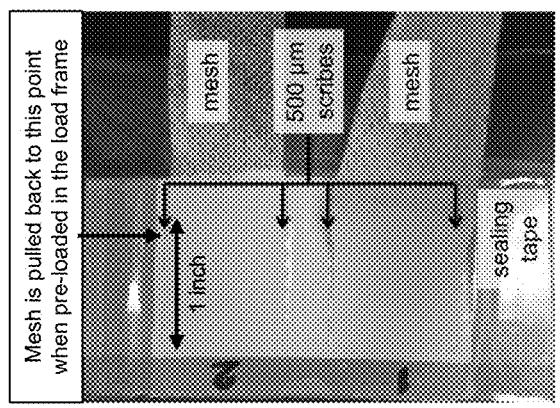
FIG. 8 is a digital image showing a completed ASTM C794 (ASTM C794-01, Standard Test Method for Adhesion-in-Peel of Elastomeric Joint Sealants, ASTM International, West Conshohocken, Pa., 2001) test specimen showing the location of the mesh strips and the scribes used to damage the sealant.

The sealant formulations evaluated included a control, which did not include any self-healing additives, and versions incorporating 3 wt %, 6 wt % and 10 wt %. The peel strengths of the disparate sealant formulations were evaluated according to ASTM C794. The loose ends of the polyester mesh of the samples described above at FIGS. 7A-7C were bent back at 180° and using a 500-micron scribe tool, the samples were damaged by cutting through the sealant, down to the substrate, along the edge of the mesh as depicted at FIG. 8. Three sets of samples were evaluated. The peel strengths for the first set of samples were evaluated immediately after scribing (referred to herein as a "dry" condition), while the peel strengths for the remaining two sets of samples were evaluated after 500 hours of salt fog exposure (ASTM B117) and 1000 hours of salt fog exposure, respectively. To start the peel test, a small pre-cut was applied to the cured sealant to facilitate onset of the peeling process of the peel test. One set of the load frame grips was clamped onto the side containing the pre-cut. The other set of grips was clamped onto the mesh bent back at a 180° angle with respect to the damaged area (refer to FIGS. 8-9). The mesh was preloaded and pulled back up adjacent to the side of the scribes closest to the free end of the mesh. The mesh was peeled back at a rate of 50 mm/min along the 1-inch scribes. The peel strength for each mesh loaded was recorded as the average peel strength along the 1-inch section. Three panels, each with two polyester meshes, were tested for each type of formulation evaluated.

Figure 10:
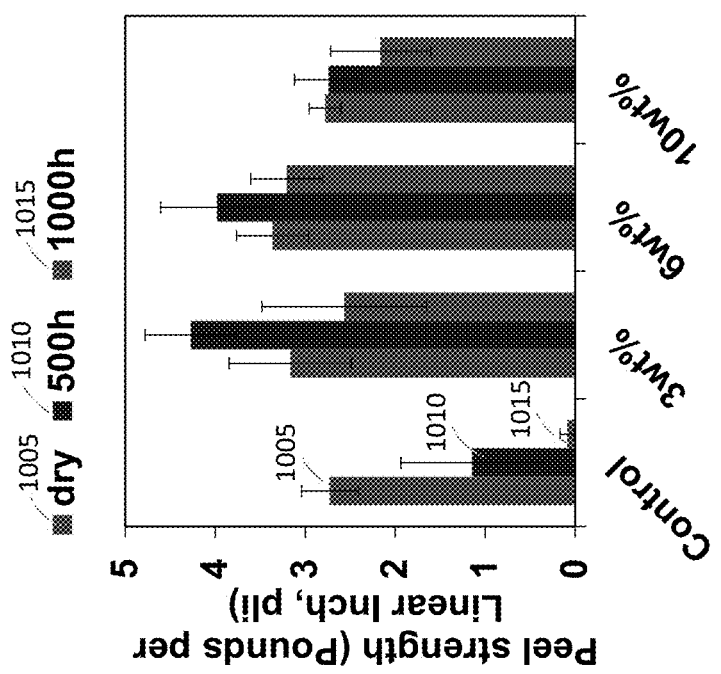
FIG. 10 is a graph that shows a summary of peel test results obtained for a control sealant formulation as well as formulations incorporating 3 wt %, 6 wt %, and 10 wt % AMPARMOR 1043. For each of the formulations tested, dry samples (which were not exposed to ASTM B117 conditions) are compared to samples exposed to ASTM B117 conditions for 500 h and 1000 h.
Figure 11:
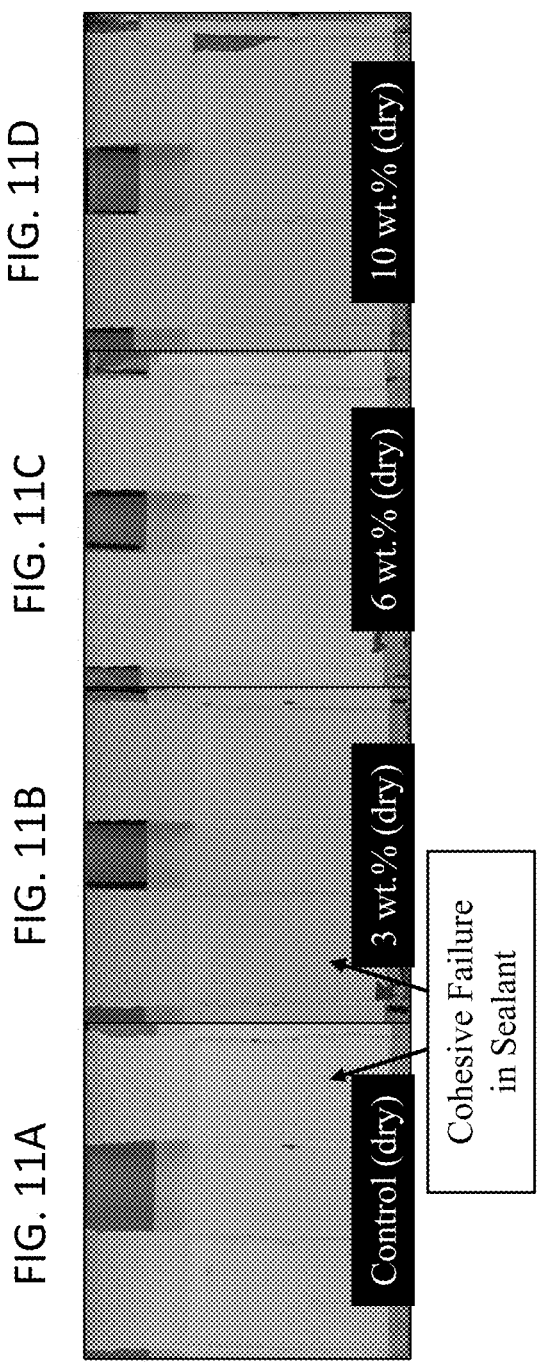
FIGS. 11A-11D are a set of digital images acquired following peel tests of a control sealant formulation as well as formulations incorporating 3 wt %, 6 wt %, and 10 wt % AMPARMOR 1043. The peel tests were performed on samples that were not exposed to ASTM B117 conditions.
Figure 12:
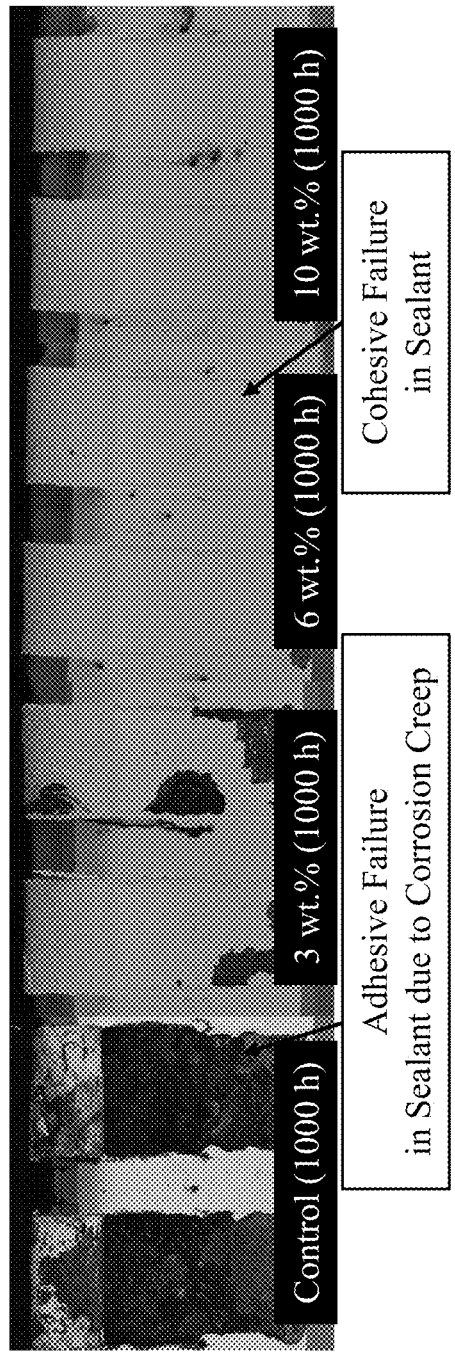
FIGS. 12A-12D are a set of digital images acquired following peel tests of a control sealant formulation as well as formulations incorporating 3 wt %, 6 wt %, and 10 wt %

The peel strength results obtained for the sealant formulations evaluated are summarized in FIG. 10. The dry condition as mentioned above is referred to by numeral 1005, the 500 hours of salt fog exposure condition is referred to by numeral 1010, and the 1000 hours of salt fog exposure condition is referred to by numeral 1015. For clarity, the respective numerals are just depicted for the control condition, but it may be understood that the same conditions apply to each of the 3 wt %, 6 wt %, and 10 wt % samples, in the same order (e.g., the dry condition is followed by the 500 hour salt fog condition, which is in turn followed by the 1000 hour salt fog condition) as those illustrated for the control condition. For the control sealant formulation, peel strength was observed to decrease with increasing salt fog exposure. These results are consistent with the observations made for the coating evaluations discussed above. Damage in the form of scribes made down to the substrate adjacent to the mesh may be understood to have created an entry point for the salt fog leading to corrosion at the sealant/substrate interface. As expected, corrosion at the sealant/substrate interface compromised the peel strength of the sealant, with longer exposure (1000 h vs. 500 h) leading to a greater decrease in peel strength. An evaluation of the sealant samples after peel testing confirmed that in the absence of salt fog exposure the control exhibited cohesive failure in the silicone sealant (FIG. 11A), after 1000 h of salt fog exposure, the underlying CRS was significantly corroded, compromising the adhesion of the sealant to the substrate (FIG. 12A). Sealant formulations incorporating 3 wt %, 6 wt % and 10 wt % of AMPARMOR 1043, that were not exposed to ASTM B117 conditions (numeral 1005), all exhibited similar peel strengths to the control suggesting that the incorporation of AMPARMOR 1043 into the sealant formulation was not deleterious to the peel strength of the sealant (FIG. 10). Further, as also summarized in FIG. 10, improved maintenance of peel strength was observed for the sealant formulations incorporating AMPARMOR 1043 (refer to numerals 1010 and 1015 for control as compared to the 3 wt %, 6 wt %, and 10 wt % conditions). Consistent with the peel strengths recorded for the sealant formulations incorporating AMPARMOR 1043, cohesive failure was observed in the corresponding samples evaluated following peel testing for the set of samples that were not exposed to ASTM B117 conditions (FIGS. 11B-11D) as well as for some of the samples exposed to ASTM B117 conditions for 1000 h (FIGS. 12B-12D). The latter set of results is indicative of the benefit of the release and subsequent polymerization of the healing agents comprising AMPARMOR 1043 at the site of damage upon damaging the sealant via scribing.

To demonstrate the improvement of a silicone-based sealant or adhesive incorporating AMPARMOR 1043 on non-metal substrates, similar peel strength specimens were prepared using TPO (Thermoplastic Polyolefin) as a substrate (refer to Example 6 and Example 9). The samples were scribed as shown in FIG. 8 and loaded into the load frame as was described above for the CRS samples (see FIG. 9). The resulting peel test results are summarized in FIG. 13. For the standard sealant, the samples immersed in deionized water for 7 days exhibited a 60% decrease in peel strength from 3.5 pli to 1.4 pli. Samples incorporating AMPARMOR 1043 did not exhibit any significant decrease in peel strengths. At FIG. 13, dry conditions are represented by numeral 1305, and immersed conditions are represented by numeral 1310. For clarity, the numerals are depicted just for the control sample, but it may be understood that each condition also applies to each of the 3 wt %, 6 wt %, and 10 wt % samples (where the dry condition is followed by the immersed condition, similar to the control sample). Consistent with the observations made for the sealant formulation applied on CRS, the control and 3 wt % sealant formulations applied on TPO exhibited cohesive failure for samples that were not immersed in water (FIGS. 14A-14B), whereas the 6 wt % and 10 wt % sealant formulations did not (FIGS. 14C-14D). Upon immersion in deionized water for 7 days, the standard silicone sealant, which did not incorporate any AMPARMOR 1043 exhibited adhesive failure (see FIG. 15A) consistent with the decrease in peel strength described above at FIG. 13. Similarly, consistent with peel strengths that practically showed no decline after immersion (FIG. 13, 3 wt %-10 wt % samples), versions of the sealant formulation incorporating 3 wt %, 6 wt % and 10 wt % all exhibited some level of cohesive failure but did not exhibit the adhesive failure as seen in the control after immersion in deionized water for 7 days (FIGS. 15B-15D).

Taken together, these results demonstrate the benefits of the incorporation of the dual microcapsules into silicone-based protective material (or other materials) as disclosed herein, in terms of improving the ability of the silicone-based protective material (or other materials) to remain on substrates ranging from CRS to TPO. For example, such protective materials that otherwise lack the dual microcapsule system of the present disclosure may rarely exhibit sufficient adhesion to their target applications, and when breached due to damage, moisture ingress and/or germane corrosion adhesion loss at the protective material/substrate interface may be accelerated. Use of the dual microcapsules of the present disclosure may facilitate adhesion post-damage or degradation events, which may enable the substrate and its protective material to remain in service longer. This may create value for end users by lengthening maintenance cycles, and by limiting down time and labor costs over the lifetime of the assets the protective materials protect.

To a significant extent, as assessed in salt fog exposure as well as via electrochemical methods as herein discussed, the self-healing performance (the ability of the coating or protective material to maintain adhesion to underlying substrates after a degradation event (e.g., crack, scratch, mechanical failure, etc.) was shown to be concentration dependent. Formulations incorporating 6 wt % and 10 wt % microcapsules did not exhibit adhesion loss around the scribe made in the coated samples after 1,000 hours of salt fog exposure. Sealant samples, which were at least 100% thicker relative to the coating samples, exhibited less concentration dependence between 3 wt % and 10 wt % of AMPARMOR 1043 incorporated into the formulation. This observation likely is due to the increase in the amount (volume or mass) of healing agent deliverable at the site of damage in the thicker sealant relative to the coating. For example, increasing the material (coating or sealant) thickness by a factor of 2 (e.g., 500 microns to 1000 microns) while keeping the mass fraction of microcapsules constant (for example at 3 wt %) results in an increase in the amount of healing agent deliverable at the site of damage by a factor of 2. In other words, the amount of healing agent deliverable at the site of damage in a formulation containing 3 wt % capsules and applied at a thickness of 1,000 microns is equivalent to the amount of healing agent deliverable at the site of damage in a formulation containing 6 wt % capsules and applied at a thickness of 500 microns.

EXAMPLES

Examples 1 & 2. Preparation of Capsule Type A (Example 1) and Capsule Type B (Example 2)

200 mL of deionized $H_2O$ was measured into a clean 1000 mL container. 50 mL of a previously prepared solution of 5 wt % poly(ethylene-co-maleic anhydride) (E400 EMA Copolymer) was added to the container. 5 g of urea, 0.5 g $NH_4Cl$ and 0.5 g of resorcinol (previously ground) were then added to the container and the solution was mixed until all the ingredients were completely dissolved. The pH of the solution was measured to be between 2.3 and 2.4 and it was adjusted to 3.5 by adding a 5 wt % solution of NaOH drop-wise. The container was then set up in a water bath on a programmable hot plate. A mixer blade or homogenizer was placed in the container and started to apply shear to the solution at a specified rate (2000 RPM for 25-micron capsules and 6000 RPM for 10-micron capsules). The core phase to be microencapsulated (Capsule Core A to prepare Capsule Type A and Capsule Core B to Prepare Capsule Type B) was then added (separate solutions for the production of the different capsule types). The emulsion particle size was measured via optical microscopy to ensure that it was in the desired range. After 10 to 15 minutes of milling, 12.77 g of 37 wt % aqueous solution of formaldehyde was added to the container. 10 to 15 drops of octanol were added at regular intervals to prevent foaming. The hot plate was started to increase the temperature of the reaction mixture to 55° C. at a rate of 1° C./min (60° C./h). The timer was then set for 4 hours. After the completion of the reaction, the reaction mixture was cooled to room temperature before beginning the isolation process of the capsules. The reaction mixture was washed thoroughly to remove excess surfactant and any unreacted ingredients. Washed capsules were re-slurried with deionized water and spray-dried to obtain microcapsules in dry powder form.

Example 3. Metal Substrate Preparation

SSPC-SP3 steel substrates were prepared by abrading using an 80-grit belt sander in four directions. The substrates were then cleaned with acetone using a lint free cloth. Compressed air was then applied over the substrate to remove any remaining dust particles. SSPC-SP6 and SSPC-SP10 substrates were acquired already blasted. These substrates were simply cleaned using acetone and a lint free cloth. Compressed air was then applied over the substrate to remove and remaining dust particles.

Example 4. Thermoplastic Polyolefin Substrate Preparation

The substrates used in this work were thermoplastic polyolefin (TPO) and cold rolled steel (CRS). TPO membrane was cut into 2 in×4 in pieces and adhered to CRS panels using an epoxy adhesive. The TPO surface was washed with soap and DI water and allowed to air dry. A 2K waterborne epoxy primer was applied to the TPO surface to obtain a dry film thickness of 1-2 mils prior to application of the silicone sealant.

Example 5. Silicone Coating Preparation and Application

AMPARMOR™ 1043 A and AMPARMOR™ 1043 B measuring 25 μm in diameter were weighed and co-fluidized in a small sealed air-filled container. The resulting mixture was post-added to a 1K silicone coating at overall concentrations of 0, 3, 6 and 10 percent by weight. The coating was mixed using a power drill equipped with a paddle mixer attachment. Viscosity noticeably increased with increasing microcapsule concentrations.

Following ASTM D823 Practice E procedures, the coating was directly applied using a drawdown bar to cleaned CRS panels. The coating was applied to obtain 8-10 mils dry film for EIS testing and 18-20 mils dry film for adhesion testing. The samples were allowed to cure at room temperature for 14 days.

Example 6. Peel Test Specimen Preparation

Following ASTM C794 procedures, the sealant was applied to cleaned CRS or to primed TPO (refer to Example 4) in a sequence of steps shown in FIG. 7. The first layer was applied to obtain 20-22 mils of wet film. The ends of two 1 in×10 in strips of low-profile fusion-bonded reinforcing polyester fiber mesh were placed on top of the film 0.5 in apart along the 3-inch side of the panels. The final layer was applied to obtain a combined thickness of 40-44 mils. The samples were allowed to cure at room temperature for 14 days.

Example 7. Scribing and Adhesion Evaluation Following Salt Fog Exposure

Each panel prepared according to ASTM D823 was damaged using a 156 μm van Laar scribe tool and a 500 μm Sikkens type scribe tool fitted into an Erichsen model 639 panel scratcher. The scribes were 1 inch in length and 2 inches apart. The panels were allowed to equilibrate at room temperature for 2 days. Unprotected areas of the panels were sealed using clear polyester sealing tape then subjected to ASTM B117 testing for 300 hours and 1000 hours.

After ASTM B117 testing, CRS panels prepared according to ASTM D823 were evaluated for loss of adhesion as outlined in ASTM D1654 Procedure A Method 2. A rounded spatula held perpendicular to the panel surface and parallel to the scribe was used to remove loosely adhered coating. A sliding caliper was used to measure the loss of adhesion from six points along the scribe. Three panels were evaluated for each condition.

Example 8. Evaluation Via Electrochemical Impedance Spectroscopy (EIS)

Electrochemical characterization was performed using a 3-electrode electrochemical set-up in 3 wt. % NaCl solution and a VMP3 multichannel potentiostat (VMP3, Biologic, USA). A glass cylinder was affixed to the coated metal surface to be evaluated by a rubber O-ring clamped to the substrate and filled with 3 wt. % NaCl solution. The reference electrode (standard silver/silver chloride electrode) and counter electrode (platinum wire) were then inserted into the electrolyte solution. The working electrode was connected to the sample (coated metal substrate) to be tested. The total tested area was 7 $cm^2$. The open circuit potential (OCP) was measured for 15 minutes to ensure that the system was stable and at equilibrium before making impedance measurements. Impedance measurements were carried out at OCP by applying a 10 mV sinusoidal voltage and varying the frequency from 0.1 Hz to 100 kHz. The coated panels were damaged with 500 μm scribe and allowed to equilibrate for 48 hours before acquiring EIS measurements.

EIS measurements were performed on scribed coatings incorporating AMPARMOR 1043 at 0, 3, 6, and 10 wt %.

Example 9. Evaluation of Peel Strength

Figure 9:
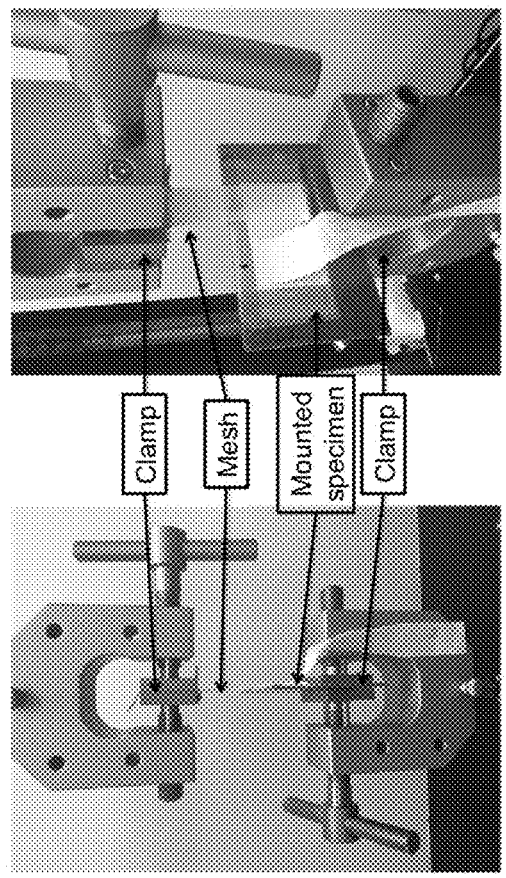
FIG. 9 is a set of digital images showing a ASTM C794 tensile test setup from two different viewing angles. The images depict the CRS substrate sealed with the PDMS sealant positioned in a load frame for the test.

Panels prepared according to ASTM C794 were damaged using a 500 μm Sikkens type scribe tool fitted into an Erichsen model 639 panel scratcher. Two parallel scribes 1 inch in length were placed along the sides of the polyester fiber mesh. The panels were allowed to equilibrate at room temperature for 2 days then sealed using clear polyester sealing tape. A finished sample is shown in FIG. 8. Half of the TPO panels were left dry at room temperature while the other half were immersed in DI water for 7 days. The CRS panels were divided into three groups: dry, 500 hours and 1000 hours in ASTM B117 conditions. Adhesion peel strength was measured for the ASTM C794 panels. The loose ends of the polyester mesh were bent back 180° and a cut was placed along the silicone-substrate interface using a razor blade. The panels were secured on a load frame set to tensile test. One set of grips was clamped onto the side containing the fresh cut. The other set of grips was clamped onto the mesh bent back 180° with respect to the fresh cut. The test setup is shown in FIGS. 8-9. The mesh was preloaded and pulled back up to the point where the scribes start. The mesh was peeled back at a rate of 2 in/min along the 1-inch scribes. The peel strength for each mesh was recorded as the average peel strength along the 1-inch section. Three panels each with two polyester meshes were evaluated for each condition.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:
1. A method for protecting a substrate, comprising:
applying a formulation to the substrate, the formulation including a fluid matrix, a first microcapsule having a silicone-based resin formulation encapsulated by a shell wall, and a second microcapsule having a silicone-based curing formulation encapsulated by a shell wall, wherein the encapsulated silicone-based resin formulation includes a first polydimethylsiloxane resin, a first silicone fluid, a first functionalized alkoxysilane, and a catalyst capable of catalyzing hydrosilylation reactions; and wherein the encapsulated silicone-based curing formulation includes a second polydimethylsiloxane resin, a second silicone fluid, a second functionalized alkoxysilane, and a hydrogen-terminated dimethyl siloxane resin.

2. The method of claim 1, wherein the first polydimethylsiloxane resin comprises a vinyl-terminated polydimethylsiloxane resin.

3. The method of claim 1, wherein the catalyst comprises a platinum catalyst.

4. The method of claim 1, wherein the second polydimethylsiloxane resin comprises a vinyl-terminated polydimethylsiloxane resin.

5. The method of claim 1, wherein the first microcapsule comprises a first polymeric shell wall; and
wherein the second microcapsule comprises a second polymeric shell wall.

6. The method of claim 5, wherein the first polymeric shell wall is comprised of a same chemical constituent as that of the second polymeric shell wall.

7. The method of claim 5, wherein the first polymeric shell wall is comprised of a different chemical constituent as that of the second polymeric shell wall.

8. The method of claim 1, wherein each of the first microcapsule and the second microcapsule have a median particle size in a range of 5 microns to 50 microns.

9. The method of claim 1, wherein the formulation hardens to form a protective material; and
wherein a degradation of the protective material results in rupture of the first microcapsule and the second microcapsule at the site of the degradation, further resulting in a mixing of the encapsulated silicone-based resin formulation with the encapsulated silicone-based curing formulation.

10. The method of claim 9, wherein the degradation comprises one or more of a mechanical failure, a scratch, a crack, and a cut.

11. The method of claim 1, wherein protecting the substrate further comprises reducing corrosion of the substrate by preventing or reducing moisture ingress.

12. The method of claim 1, wherein the fluid matrix comprises one of a silicone-based matrix, an epoxy matrix, a polyester matrix, a polyurethane matrix, and an acrylic matrix.

13. A method for increasing a peel-resistance of a coating or sealant for a substrate, comprising:
applying a formulation to the substrate that hardens to form the coating or sealant, the formulation comprising a fluid matrix, a first microcapsule having a silicone-based resin formulation encapsulated by a shell wall, and a second microcapsule having a silicone-based curing formulation encapsulated by a shell wall, wherein a degradation of the coating or sealant causes the first microcapsule and the second microcapsule to rupture, thereby mixing the encapsulated silicone-based resin formulation and the encapsulated silicone-based curing formulation at the site of the degradation and increasing the peel-resistance of the coating or sealant,
wherein the encapsulated silicone-based resin formulation includes a first polydimethylsiloxane resin, a first silicone fluid, a first functionalized alkoxysilane, and a catalyst capable of catalyzing hydrosilylation reactions; and wherein the encapsulated silicone-based curing formulation includes a second polydimethylsiloxane resin, a second silicone fluid, a second functionalized alkoxysilane, and a hydrogen-terminated dimethyl siloxane resin.

14. The method of claim 13, wherein the degradation comprises one or more of a mechanical failure, a scratch, a crack, and a cut.

15. The method of claim 14, wherein the catalyst comprises a platinum catalyst.

16. The method of claim 13, wherein the first polydimethylsiloxane resin and the second polydimethylsiloxane resin each comprise a vinyl-terminated polydimethylsiloxane resin.

17. The method of claim 13, wherein the first silicone fluid and the second silicone fluid are the same.

18. The method of claim 13, wherein the first silicone fluid and the second silicone fluid are different.

19. The method of claim 13, wherein the first functionalized alkoxysilane and the second functionalized alkoxysilane are the same.

20. The method of claim 13, wherein the first functionalized alkoxysilane and the second functionalized alkoxysilane are different.

21. The method of claim 13, wherein the first functionalized alkoxysilane and the second functionalized alkoxysilane are selected from the group consisting of 3-glycidoxypropyltrimethoxysilane and 3-glycidoxypropyltriethoxysilane.

22. The method of claim 13, wherein the first microcapsule and the second microcapsule each have a polymeric shell wall.

23. The method of claim 22, wherein the polymeric shell wall comprises one or more of polyoxymethylene urea, polyoxymethylene melamine, polyacrylate, polyurethane, and polyurea.

24. The method of claim 13, wherein the fluid matrix is one of a silicone-based matrix, an epoxy matrix, a polyester matrix, a polyurethane matrix, and an acrylic matrix.

25. A self-healing composition comprising:
a fluid matrix,
a first microcapsule having a silicone-based resin formulation encapsulated by a shell wall and a second microcapsule having a silicone-based curing formulation encapsulated by a shell wall,
wherein the encapsulated silicone-based resin formulation includes a first polydimethylsiloxane resin, a first silicone fluid, a first functionalized alkoxysilane, and a catalyst capable of catalyzing hydrosilylation reactions; and wherein the encapsulated silicone-based curing formulation includes a second polydimethylsiloxane resin, a second silicone fluid, a second functionalized alkoxysilane, and a hydrogen-terminated dimethyl siloxane resin.

26. The self-healing composition of claim 25, wherein the first polydimethylsiloxane resin and the second polydimethylsiloxane resin comprise vinyl-terminated polydimethylsiloxane resins.

27. The self-healing composition of claim 25, wherein the first silicone fluid and the second silicone fluid are the same or are different; and wherein the first silicone fluid and the second silicone fluid comprise one or more of hexamethyldisiloxane, octamethyltrisiloxane, and decamethyltetrasiloxane.

28. The self-healing composition of claim 25, wherein the first functionalized alkoxysilane and the second functionalized alkoxysilane are the same or are different; and
wherein the first functionalized alkoxysilane and the second functionalized alkoxysilane comprise one or more of 3-glycidoxypropyltrimethoxysilane and 3-glycidoxypropyltriethoxysilane.

29. The self-healing composition of claim 25, wherein the catalyst is a platinum catalyst.

30. The self-healing composition of claim 25, wherein the first microcapsule and the second microcapsule each have a polymeric shell wall.

31. The self-healing composition of claim 30, wherein the polymeric shell wall of the first microcapsule and the second microcapsule is the same or is different; and
wherein the polymeric shell wall comprises one or more of polyoxymethylene urea, polyoxymethylene melamine, polyacrylates, polyurethane and polyurea.

32. The self-healing composition of claim 25, wherein the self-healing composition hardens to form a protective coating or sealant when applied to a substrate; and
wherein a degradation of the protective coating or sealant results in rupture of the first microcapsule and the second microcapsule at the site of the degradation, further resulting in a mixing of the encapsulated silicone-based resin formulation with the encapsulated silicone-based curing formulation.

33. The self-healing composition of claim 25, wherein the fluid matrix comprises one of a silicone-based matrix, an epoxy matrix, a polyester matrix, a polyurethane matrix, and an acrylic matrix.

34. A method of preparing a self-healing composition, comprising:
encapsulating a silicone-based resin formulation in a shell wall to form a first microcapsule and encapsulating a silicone-based curing formulation in a shell wall to form a second microcapsule, and
adding a first amount of the first microcapsule and a second amount of the second microcapsule to a fluid matrix to obtain the self-healing composition;
wherein the silicone-based resin formulation comprises a first polydimethylsiloxane resin, a first silicone fluid, a first functionalized alkoxysilane, and a catalyst capable of catalyzing hydrosilylation reactions; and
wherein the silicone-based curing formulation comprises a second polydimethylsiloxane resin, a second silicone fluid, a second functionalized alkoxysilane, and a hydrogen-terminated dimethyl siloxane resin.

35. The method of claim 34, wherein the fluid matrix further comprises one of a silicone-based matrix, an epoxy matrix, a polyester matrix, a polyurethane matrix, and an acrylic matrix.

36. The method of claim 34, further comprising drying the first microcapsule and the second microcapsule into powder prior to adding the first microcapsule and the second microcapsule to the fluid matrix.

37. The method of claim 34, wherein the first amount and the second amount are the same.

38. The method of claim 34, wherein the first amount and the second amount are different.

39. The method of claim 34, wherein each of the first microcapsule and the second microcapsule comprise a polymeric shell wall.

40. The method of claim 39, wherein
the polymeric shell wall comprises one or more of polyoxymethylene urea, polyoxymethylene melamine, polyacrylates, polyurethane, and polyurea.

41. The method of claim 34, wherein the first polydimethylsiloxane resin and the second polydimethylsiloxane resin comprise a vinyl-terminated polydimethylsiloxane resin.

42. The method of claim 34, wherein the first functionalized alkoxysilane and the second functionalized alkoxysilane comprise one or more of 3-glycidoxypropyltrimethoxysilane and 3-glycidoxypropyltriethoxysilane.

43. The method of claim 34, wherein the catalyst is a platinum catalyst.

44. The method of claim 43, wherein the platinum catalyst is one or more of $H_2PtCl_6$ and $C_{24}H_{54}O_3Pt_2Si_6$.

45. The method of claim 34, wherein the first microcapsule and the second microcapsule each have a median particle diameter in a range of 5-50 microns.

* * * * *